(12) United States Patent
Tucker

(10) Patent No.: US 11,638,865 B2
(45) Date of Patent: May 2, 2023

(54) PACE TARGETS WITH ON COURSE RATING SYSTEMS

(71) Applicant: John N. Tucker, Lexington, VA (US)

(72) Inventor: John N. Tucker, Lexington, VA (US)

(*) Notice: Subject to any disclaimer, the term of this patent is extended or adjusted under 35 U.S.C. 154(b) by 0 days.

(21) Appl. No.: 17/175,047

(22) Filed: Feb. 12, 2021

(65) Prior Publication Data

US 2021/0252371 A1 Aug. 19, 2021

Related U.S. Application Data

(60) Provisional application No. 62/976,762, filed on Feb. 14, 2020.

(51) Int. Cl.
*A63B 71/06* (2006.01)
*A63B 24/00* (2006.01)
*A63B 69/00* (2006.01)

(52) U.S. Cl.
CPC ...... *A63B 71/0686* (2013.01); *A63B 24/0062* (2013.01); *A63B 69/0028* (2013.01); *A63B 71/0622* (2013.01); *A63B 2024/0068* (2013.01)

(58) Field of Classification Search
CPC ............ A63B 71/0686; A63B 71/0622; A63B 24/0062; A63B 69/0028; A63B 2024/0068
USPC .......................................................... 700/91
See application file for complete search history.

(56) References Cited

U.S. PATENT DOCUMENTS

| | | | |
|---|---|---|---|
| 6,909,671 B2* | 6/2005 | Setler | G04F 10/00 368/110 |
| 7,572,205 B1* | 8/2009 | Cribar | A63B 24/0062 482/3 |
| 8,142,197 B2 | 3/2012 | Tucker | |
| 8,784,115 B1* | 7/2014 | Chuang | A63B 24/00 706/14 |
| 9,304,205 B2* | 4/2016 | Heikes | G01S 19/13 |
| 9,392,941 B2* | 7/2016 | Powch | G01S 19/19 |
| 2006/0281062 A1* | 12/2006 | Tucker | G09B 19/00 434/255 |
| 2017/0259145 A1* | 9/2017 | Kline | H05B 45/10 |
| 2018/0207509 A1 | 7/2018 | Tucker | |

FOREIGN PATENT DOCUMENTS

WO WO-2018160900 A1 * 9/2018 ............. A63B 22/02

* cited by examiner

*Primary Examiner* — Allen Chan
(74) *Attorney, Agent, or Firm* — Andrew M. Calderon; Calderon Safran & Cole, P.C.

(57) ABSTRACT

The present disclosure relates to on course rating systems (OCRS) and, more particularly, to its pace targets on cross country or road race course segments and related systems and methods of use. The method includes: obtaining performance equivalences (PEQs) of a first rated course including a track equivalent time of the first rated course; and obtaining a goal time, the equivalent of the first course but on a second course; and providing pace targets on selected segments for the second rated course using the track equivalent time and the goal time in order to cumulatively produce the goal time of the second rated course.

16 Claims, 2 Drawing Sheets

| Course Name | Athlete Name | | Time Data | | hr:min:sec e.g. – 0:17:30 |
|---|---|---|---|---|---|
| Balboa Park 5k | John Doe | | TE equivalent time on a track | | 0:14:18 |
| San Diego CA | | | GOAL time at Balboa Park 5k (5005m/3.1 1 mi) | | 0:15:08 |
| | | | | | |
| Splits | | | | | |
| Mile 1 | Mile 2 | | Mile 3 | | Final Segment |
| | | | | | 0.11 miles |
| <u>4:51</u> 4:48 | <u>4:52</u> 4:55 | | <u>4:53</u> 4:53 | | <u>0:32</u> 0:31 |

| Course Name | Athlete Name | | Time Data | | hr:min:sec e.g. – 0:17:30 |
|---|---|---|---|---|---|
| Balboa Park 5k | John Doe | | TE equivalent time on a track | | 0:14:18 |
| San Diego CA | | | GOAL time at Balboa Park 5k (5005m/3.11 mi) | | 0:15:08 |
| | | | | | |
| Splits | | | | | |
| Mile 1 | Mile 2 | | Mile 3 | | Final Segment |
| | | | | | 0.11 miles |
| 4:51<br>4:48 | 4:52<br>4:55 | | 4:53<br>4:53 | | 0:32<br>0:31 |

FIG. 1

PACE TARGETS WITH ON COURSE RATING SYSTEMS

FIELD OF THE INVENTION

The present disclosure relates to on course rating systems and, more particularly, to pace targets on cross country or road race course segments and related systems and methods of use.

BACKGROUND

Historically, one of the biggest challenges in competitive cross country and road racing has been to know exactly how well you just performed on a typical course. Unlike performances on tracks which are all identical and produce results with universal meaning and relativity, a performance (e.g., the time it took to run) on a cross country or road race course tells you little about how well you just ran, your current fitness level, and almost nothing about your potential on another course.

SUMMARY

Today athletes and coaches can see what their cross country time would have been (its equivalent) on a track or on another course so they can know exactly how well they ran, how to train smarter, and what time they are capable of running (their ultimate goal time) on a hilly and challenging course they may have never seen. For example, On Course Rating Systems (OCRS) provide the user with how well you just ran, your current fitness level, and your potential on another course. The OCRS website (https://oncourseratingsystems.com/) currently lists 59 rated courses in twelve different states ranging from 4000 meters (4 k) to 10,000 meters (10 k) in length; however for simplicity of illustration, this disclosure will be limiting references to courses or track races to those in the 5 k category, or those whose nominal length is 5000 meters. Data collection and analysis in producing Performance Equivalents and Pace Targets will be the same for courses of differing lengths.

The pace targets are the newest technology in the evolution of competitive advantages for runners beginning with the OCRS course difficulty rating method (see U.S. Pat. No. 8,142,197, which is incorporated by reference herein in its entirety). Pace targets are built on and can be generated in combination with data and processes produced by the OCRS processes. One of the technologies that can be derived from the referenced OCRS processes is Performance Equivalences (PEQs). More detail on PEQs follows.

In embodiments, pace targets (PTs) are an athlete's per mile times, customized to his or her individual current fitness level, calculated to identify an energy efficient pace each mile for that athlete to cumulatively produce a selected goal time/performance, up to and including the best performance that athlete is capable of on an OCRS rated course, based on the overall difficulty rating of the course and specific difficulty factors within each mile. While any OCRS rated course segment length could be selected for pace targeting, for the remainder of this disclosure pace targets will apply to per mile segment lengths.

BRIEF DESCRIPTION OF THE DRAWINGS

The present disclosure is described in the detailed description which follows, in reference to the noted plurality of drawings by way of non-limiting examples of exemplary embodiments of the present disclosure.

FIG. 1 shows a pace target application and processes in accordance with aspects of the present disclosure.

DETAILED DESCRIPTION

Figure 2:
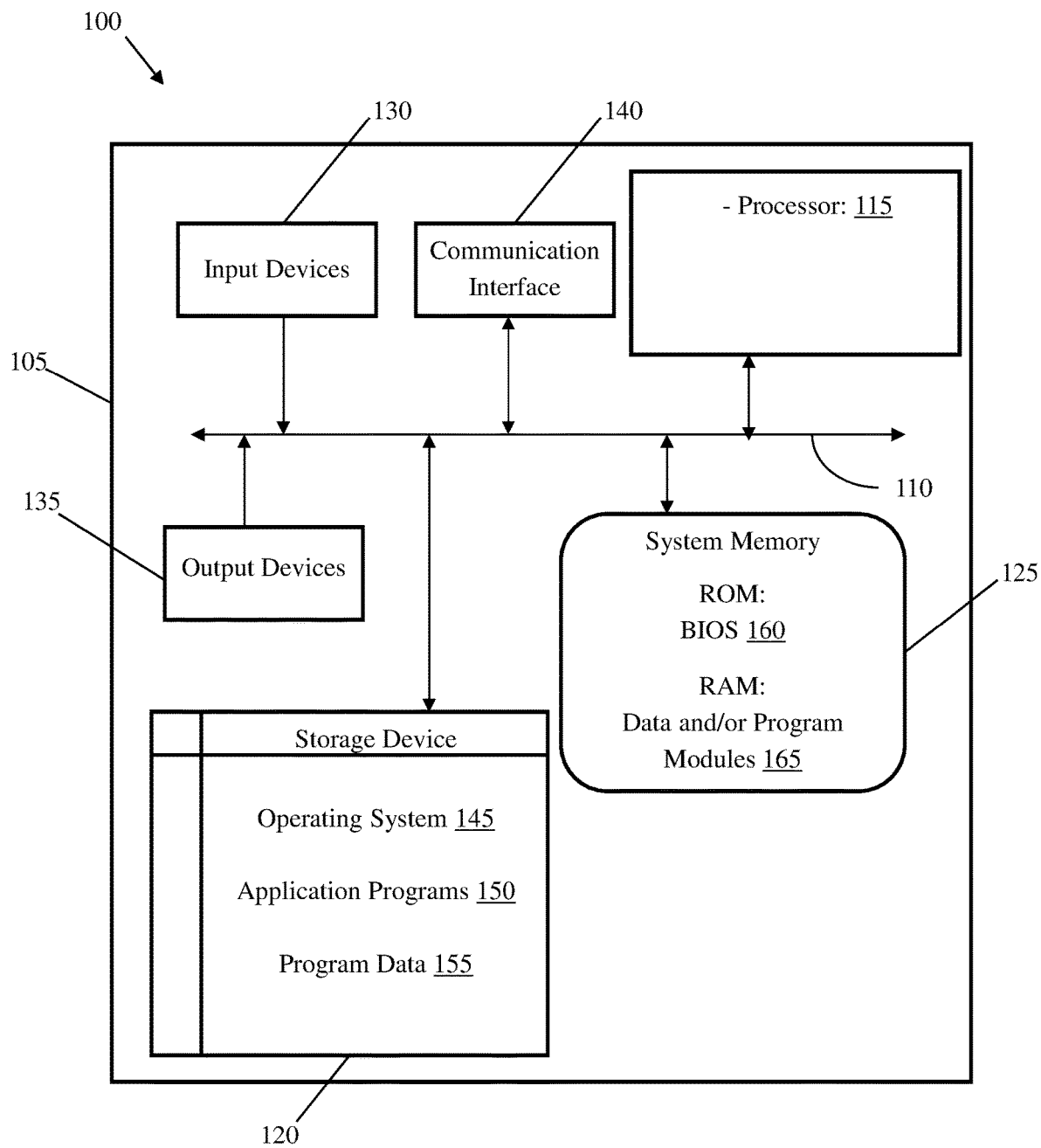
FIG. 2 shows a computing infrastructure used with the pace target application and processes in accordance with aspects of the present disclosure.

The present disclosure relates to on course rating systems and, more particularly, to pace targets on cross country or road race course segments and related systems and methods of use. More specifically, the present disclosure provides pace targets formulated with performance equivalence (PEQ) times/data from OCRS rated courses. Advantageously, the pace targets provide a competitive advantage by helping a runner identify the energy efficient paces they should run each mile to produce that goal time on an OCRS rated course. The pace targets also help runners avoid one of the biggest mistakes in cross country and road racing: going out at a pace much faster than they are capable of maintaining for the entire distance, often with predictably disastrous results.

By way of illustration, an OCRS performance equivalence (PEQ) calculator (e.g., www.oncourseratingsystems.com) shows runners how relatively competitive their performances were on cross country or road race courses which, unlike tracks, are all unique and vary widely in difficulty. For example, races in Track and Field are all run on level, uniformly designed and surfaced 400 meter tracks. Performances on them are universally relative and meaningful. For example, a 15:00 5 k (3.1 miles) performance on one track would be roughly equivalent to a 15:00 on any other track if run in the same conditions. On the other hand, races in cross country and road racing occur on courses which range from flat and fast to hilly and challenging. So, a 15:00 performance in favorable weather conditions on a dry, entirely flat cross country course which is exactly 5000 m in length will not be nearly equivalent to a 15:00 run on an extremely hilly and challenging one even with identical length, surface and weather conditions.

In the past, knowing how relatively competitive a runner was on these vastly differing courses, beyond overall time and finish position, has been difficult at best. The inconsistent and inaccurate measurement of courses historically has made it even more difficult. Knowing the right paces per mile to run your best potential race, especially on the most challenging courses has been impossible. However, by precision measuring and assigning factors of difficulty to and computing performance equivalences from these very different cross country and road racing courses, the present technology can now show athletes all of the following information:

(i) what their performance on one course would be (its equivalent) on another course or track, accurately showing them how competitively they ran, how to train better, and how to plan upcoming races;

(ii) what overall (Goal) time in minutes and seconds they are capable of running in an upcoming race on a course they have never seen;

(iii) what energy efficient paces per mile they should run to achieve that Goal time on an OCRS rated course; and (iv) how to avoid the #1 mistake in cross country and road races, i.e., going out much too fast.

Pace targets are the latest evolution in the course difficulty rating system and can be formulated only with performance equivalence (PEQ) times/data from OCRS rated courses. The pace targets can be found and calculated in the following manner.

(i) obtaining a track equivalent time (TE); and
(ii) selecting a goal time, or selected performance level on another OCRS rated course.

Both TE and Goal times should be the equivalent of each other as described and shown by the pace target application and entered exactly that way as shown in the pace target application as shown in FIG. 1 to produce accurate pace targets. In FIG. 1, the pace target application includes course name, athlete name, time date, and splits, e.g., mile segments.

To illustrate the use of the pace target application (e.g., technology described herein), take the following fact pattern:

(i) athlete (e.g., John Doe) runs a race on a dry, moderately difficult OCRS rated University of Wisconsin Parkside 4992 meter course in favorable weather conditions producing a time of 14:52, and who will be running on the hilly and much more challenging OCRS rated Balboa Park 5005 meter course two weeks later in San Diego.

(ii) The pace target application as shown in FIG. 1 shows him that his 14:52 at Parkside is the equivalent of 14:18 for 5000 meters on a track (his TE), and 15:08 at Balboa Park (his Goal time), which now can be used to request and calculate OCRS pace targets.

Note that the TE and Goal times of 14:18 and 15:08 show a time differential of 50 seconds. That time differential reflects one aspect of the difficulty of the Balboa Park 5 k course at that performance level. Accordingly, it will take the runner in this example 50 additional seconds (the TE/Goal time differential) to run 15:08 at Balboa Park than it would take him to run at the same performance level (with the same energy) for 5000 meters on a track, or 14:18. The TE and Goal time numbers are entered into the OCRS pace target application (see FIG. 1) which then distributes those additional 50 seconds (also described in more detail below) into a per mile and last fraction of a mile target paces at Balboa Park to cumulatively produce his Goal time.

More specifically, FIG. 1 shows per mile pace targets as they would appear if requested, in the OCRS pace target application, calculated for John Doe on the OCRS difficulty rated Balboa Park 5 k (5005 m) cross country course, to cumulatively produce an overall (goal) time there of 15:08, which is equivalent to a 14:52 performance on the Wisconsin Parkside course in similar conditions, and which is also equivalent to a 14:18 (TE) 5 k on a track if run with equal energy in similar conditions. The pace target distributes the TE/Goal time differential of 50 additional seconds appropriately each mile on that course to produce his overall Goal time.

In FIG. 1, the per mile or "split" times (underlined) represent OCRS pace targets producing an overall Goal time of 15:08 on the OCRS rated Balboa Park 5 k course in San Diego Calif. The times in bold are the per mile split times John Doe actually ran there on Dec. 14, 2019 producing a 15:08 in dry and favorable conditions. Note that a time of 14:18 for 5000 meters (3.1 mi) on a track is an average of 4:36 per mile.

In the example above, the pace target calculator has assigned the appropriate number of additional seconds above that 4:36 per mile average TE pace, to each mile and final 0.11 of a mile at Balboa Park, correctly distributing those additional 50 seconds for John Doe on that 5005 meter course to cumulatively produce his overall goal time of 15:08. The distribution of these additional seconds to each full mile and final 0.11 of a mile above that TE pace are 15, 16, 17, and 2 seconds respectively.

The additional seconds assigned per mile are calculated based on heart rate and energy data collected on that course which, as seen, reflect topographical and other difficulty factors specific to each mile and final fraction of a mile at Balboa Park, or any cross country or road racing course on which OCRS is establishing Pace Targets. The data collection process and time calculations are described further.

For description purposes in this disclosure OCRS uses, but is not limited to using, human subjects running in what will hereafter be referred to as "test" runs, while wearing commercially available heart rate monitors which collect heart rate data and which identify the energy in Kilocalories (Kcals) used by those running subjects over an entire test run, while maintaining submaximal (relatively easy) speeds as constant as possible on courses already precision measured and difficulty rated by OCRS. These OCRS designed test runs, which collect heart rate and energy data, identify the per-mile or other selected segment topographical and other course difficulty factors so the correct number of those 50 additional seconds in this example can be appropriately distributed to produce the overall Goal time and performance level requested for that course.

Running a constant speed on a level surface will produce a certain and relatively constant heart rate. The same runner running up a hill at the same constant speed will cause his or her heart rate to increase. The same runner running downhill at the same speed requires less energy and will cause the heart rate to decrease. OCRS has its test subjects maintain relatively easy speeds that are as constant as possible in test runs over an entire course while wearing the heart rate monitors so that the increased or decreased heart rate data and corresponding energy consumption data reflect the topographical and other difficulty factors of specific segments of that course. This could accurately be described as "energy mapping" a course. This constant speed, heart rate and energy data collection method is substantially the same method as described in patent U.S. Pat. No. 8,142,197 which is incorporated by reference in its entirety herein. A distinct difference between U.S. Pat. No. 8,142,197 and the present technology, though, is that the heart rate monitor itself in this case calculates energy used by the runner wearing it.

Commercially available heart rate monitor data typically includes total time of a test run, average heart rate for an entire run, and total energy costs in Kcals for an entire run as well as average heart rate for specific segments within a test run. Energy cost data for specific segments however, is not available as of the date of this application among the various commercially available heart rate monitoring devices.

In order to formulate and identify appropriate per (mile) segment target paces OCRS uses two methods.

OCRS Segment Pace Target Method #1

Energy Costs Per Segment Method
Method #1 uses the following heart rate monitor provided data:
average heart rate (HR) data for an entire constant speed test run;
average per segment heart rate (SHR);
time (T) of an entire test run; and
energy consumed, in Kilocalories (Kcals), for an entire test run.

In addition to the above monitor provided heart rate and energy data, OCRS also manually collects each per mile segment time during the test run, which data is then combined with the OCRS TE/Goal time differential to calculate individual course segment energy costs, in the following manner:

$$F = Kcals \div (T \times HR),$$

where F is the OCRS developed course difficulty identifying Factor/multiplier (per segment); Kcals is the monitor estimated energy used by a runner in Kilocalories, for an entire run; T is Time of the entire test run in minutes and fraction of minutes (e.g., 15:30 is 15.5 minutes); and HR is average Heart Rate of entire test run.

In embodiments, F is used to identify an overall course performance energy matrix, which is used as a factor multiplier. For example, a heart rate monitor provides average heart rate per segment and for an entire test run; however, it is necessary to determine energy costs per segment on a particular course. Kcal represents entire calories for an entire run. With this information, it is possible to obtain per segment energy costs, which will identify the per segment difficulty factors on difficulty rated courses, and produce pace targets for those segments. The F factor could also be used as difficulty rating for an entire course. Specifically, T×HR reflects the level of effort for that athlete for an entire run for that course. Kcal divided by the product of these two quantities additionally reflects course difficulty.

Using the above equation with time, HR, and Kcal data collected in this example in a test run on a particular course, when applied similarly in calculations of pace targets on any rated course, will first produce the F factor. This unique expression, the product of the above equation, assigns a factor of difficulty specific to that course and can be used as a multiplier with subsequent time, energy, and HR data to produce individual segment pace targets on that course in step two of Method #1 calculations.

By way of continued illustration of Method 1, in an actual test run at Balboa Park, which took 23:24 or 23.4 minutes (T), the average heart rate (HR) for the entire run was 141, the total Kcals for the entire run was 244, those numbers would appear this way:

$$F = Kcals \div (T \times HR)$$

$$F = 244 \div (23.4 \times 141) \text{ or } F = 244 \div 3299.4 \text{ or } F = 0.0740.$$

The per (mile) segment energy costs are calculated in this way $$ST \times SHR \times F = SKcals$$

where: ST is a specific (mile) Segment Time in minutes within the test run; SHR is the specific (mile) Segment average Heart Rate; F is the course difficulty identifier Factor/multiplier calculated above, based in this example on the number of Kcals it takes an athlete to run for 23.4 (23:24) minutes at an average heart rate of 141 on the OCRS precision measured and difficulty rated Balboa Park 5 k (5005 m) course; and SKcals are the OCRS estimated energy costs per (mile) Segment in Kcals within a test run.

To illustrate how specific (mile) segment energy costs are calculated in the above example test run at Balboa Park, OCRS $1^{st}$, $2^{nd}$, and $3^{rd}$ mile and last 0.11 of a mile segment times of 7:30 (or 7.5 minutes), 7:32 (or 7.533 minutes), and 7:38 (or 7.633 minutes), and 0:44 (or 0.733 minutes) respectively, are collected and then entered along with the monitor provided specific (mile) segment average heart rates of 132, 144, 146, and 148, respectively, into the per (mile and last fraction of a mile) segment energy cost formula as follows:

| | ST × SHR × F = | SKcals | (% of SKcals) |
|---|---|---|---|
| Segment (Mile) 1: | 7:30 (7.50 minutes) × 132 × .0740 = | 73.26 | (30.03%) |
| Segment (Mile) 2: | 7:32 (7.53 minutes) × 144 × .0740 = | 80.24 | (32.89%) |
| Segment (Mile) 3: | 7:38 (7.63 minutes) × 146 × .0740 = | 82.43 | (33.79%) |
| last .11 miles: | 44 (.73 minutes) × 148 × .0740 = | 7.99 | (3.27%) |
| Totals: | | 243.92 | (100.00%) |

In embodiments, the last 0.11 of a mile time was calculated in the following way: Total time of the test run, 23:24 or 23.4 minute or 1404 seconds, minus the cumulative time in seconds, of the first three full (mile) segments or 450+452+458=1360 seconds, 1404−1360=44 seconds (0.73 minutes).

Each mile segment estimated energy costs in Kcals are shown in the column under SKcals, the total of which is shown at the bottom. The percentage of that total represented within each mile segment is shown in the column under % of total SKcals. The first mile energy cost, for example, amounts to 30.03% of the total of all the segments energy costs. The second mile energy costs amount to 32.89% of the total of all segments energy costs etc. These per segment energy costs reflected as percentages of total energy costs, identify the relative amount of energy it took the runner to run each mile and last 0.11 of a mile on the Balboa Park course at a constant speed, and also reflect the relative difficulty of those individual course segments.

Each of the per segment energy cost percentages in the % of total SKcals column can now be applied to the additional 50 second time differential above the flat/track (TE) average per mile pace of 4:36 to appropriately distribute those 50 seconds per mile segment reflecting that segment's relative difficulty in the following manner:

| | % of SKcals × TE/ Goal time differential = | seconds above TE average |
|---|---|---|
| Segment(Mile) 1: | 30.03 × 50 = | 15.02 (15) |
| Segment(Mile) 2: | 32.89 × 50 = | 16.44 (16) |
| Segment(Mile) 3: | 33.79 × 50 = | 16.89 (17) |
| last .11 mile: | 3.27 × 50 = | 1.64 (2) |

It should be noted that TE/goal time differential is a reference to the time difference in seconds between the track equivalent (TE) of the time from the first course and the goal time which is also the equivalent of the time from the first course but on the second course. This differential between TE and goal times are the additional seconds a runner will use on a course above that on a track if he or she were to run both at the same performance level in similar conditions. The most energy efficient per mile pace on a track ideally should be constant. The per mile pace on a hilly cross country course will vary depending on difficulty factors within each mile. Pace targets identifies those individual mile segment difficulty factors and distributes the additional TE/goal time seconds on them appropriately to cumulatively produce an energy efficient overall goal time.

In the example above, 15.02 (rounded to 15) seconds is the appropriate number of seconds above the track (TE) per mile pace average of 4:36 to add in the first mile. This would make the pace target for mile one 4:51 (4:36+15). The additional seconds above 4:36 in mile two would be 16.44 (rounded to 16) to make the pace target 4:52 (4:36+16) etc. They would look like this:

|  | TE average pace per mile + seconds above TE average = | Per mile Pace Targets* |
|---|---|---|
| Mile 1 | 4:36 + 15.02 (15) = | 4:51 |
| Mile 2 | 4:36 + 16.44 (16) = | 4:52 |
| Mile 3 | 4:36 + 16.89 (17) = | 4:53 |
| last .11 mi | 0:30.36 (276 × .11) + 1.64 (2) = | :32 |
| Total (goal) time |  | 15:08 |

Note that this is the first of two methods OCRS could use to calculate pace targets for John Doe in FIG. 1 using the just described HR/energy data and PEQ calculator generated TE and Goal time numbers to produce the overall time that he actually ran.

The second method is noted has follows.

OCRS Segment Pace Target Method #2

Heart Rate Percentage Method

Comparing average heart rates between individual (mile) segments and the heart rate average for an entire test run combined with the TE/Goal time differential will yield similarly accurate results in formulating pace targets for those individual segments. For example, using the same monitor produced heart rate data for the same test run at Balboa Park described above which data includes an average heart rate for the entire run of 141, and individual (mile) segment heart rate averages of 132, 144, 146, and 148, representing miles 1, 2, 3, and the last 0.11 mile respectively. Combined with OCRS TE/Goal time numbers, per segment heart rate averages, shown as percentages of the heart rate average for the entire test run, can be applied to the same average per mile track (TE) paces to produce per segment pace targets. This process begins with calculating what percentage each (mile) segment's average heart rate is to the average heart rate of the entire test run.

Per Segment heart rate percentages:

| Mile | segment average HR ÷ average HR of entire run = | % of each segment |
|---|---|---|
| 1 | 132 ÷ 141 = | 93.62% |
| 2 | 144 ÷ 141 = | 102.13% |
| 3 | 146 ÷ 141 = | 103.55% |
| last .11 miles | 148 ÷ 141 = | 104.96% |

These individual (mile and last 0.11 mi) segment average HR percentages reflect the relative effort levels (above or below the average HR/effort level of the entire test run) that each segment required from the test runner to maintain a constant speed on the Balboa Park course. These segment percentages are now to be applied to the additional 50 second OCRS TE/Goal time differential to be appropriately distributed per mile and last fraction of a mile to produce the Goal time on that course. The per mile average number of additional seconds is 16.08 (50÷3.11) and 1.77 seconds reflects the additional seconds in the last fraction (0.11) of a mile (0.11×16.08=1.77)

That distribution would look like this:
Distribution of the TE/Goal differential of 50 additional seconds at Balboa Park

| Mile | Distribution of the TE/Goal differential of 50 additional seconds at Balboa Park | Per Mile Pace Targets |
|---|---|---|
| 1 | 93.62% × 16.08 = 15.05 (15) seconds above TE average of 4:36 or | 4:51 |
| 2 | 102.13% × 16.08 = 16.42 (16) seconds above TE average of 4:36 or | 4:52 |
| 3 | 103.55% × 16.08 = 16.65 (17) seconds above TE average of 4:36 or | 4:53 |
| last .11 mile | 104.96% × 1.77 = 1.86 (2) seconds above TE average of 30.36* (30 sec) | :32 |

*276 (seconds in a 4:36 mile) × .11 = 30.36

This second and equally unique method of data collection and calculation, producing the per mile and last fraction of a mile Pace Targets exactly match those shown in method #1 for John Doe. Being less complicated and taking less time, method #2 will likely be the preferred method.

Both methods to produce OCRS pace targets are more than mere calculations of heart rate data requiring only pencil and paper and sufficient thought. It is emphasized that while the formulation of pace targets does include available heart rate data and indeed requires calculations, it is a novel and lengthy process of collection and analysis of that and many other data. Indeed this process includes data collected (in this example) by human subjects wearing heart rate monitors (mini computers), and continues by using a novel constant speed test design to identify (energy map) that data to show the relative difficulty of individual course segments which data is then analyzed (computed) using a course specific difficulty factor multiplier and applied to PEQ data which was produced on a course that was precision measured and uniquely rated for its difficulty (see U.S. Pat. No. 8,142,197), which cannot be implemented in an abstract manner using, e.g., pencil and paper alone. OCRS pace targets can be calculated and produced only with the combination of all these pieces of data. They are a revolutionary new competitive advantage and take the guesswork out of pacing cross country and road races. They will help runners and coaches train and race more effectively and avoid the nearly universal mistake of going out way too fast.

Finally, other energy measurement devices such as a self-propelled vehicle described in US patent publication no. 2018/0207509 (the contents of which are incorporated by reference in their entirety herein) could also be used for providing data for the formulation of pace targets. Additionally, other types of mobile metabolic energy measuring devices such as described in U.S. Pat. No. 8,142,197 cited above, could also be used to assign an overall course difficulty rating, and to identify specific segment difficulty factors on courses in the formulation of Pace Targets. Wearable heart rate monitors as used in the above discussion might also be accurately described as "mobile metabolic devices" cited in the above patent.

FIG. 2 shows an exemplary computing environment which can be used to implement the aspects in accordance with aspects of the present disclosure. FIG. 2 is an illustrative architecture of a computing system 100 implemented as embodiments of the present disclosure. The computing system 100 is only one example of a suitable computing system and is not intended to suggest any limitation as to the scope of use or functionality of the present disclosure. Also, computing system 100 should not be interpreted as having any dependency or requirement relating to any one or combination of components illustrated in the computing system 100.

As shown in FIG. 2, the computing system 100 includes a computing device 105. The computing device 105 can be resident on a network infrastructure such as within a cloud environment, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140. The bus 110 permits communication among the components of the computing device 105. The bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of the computing device 105.

The processor 115 may be one or more conventional processors or microprocessors that include any processing circuitry operative to interpret and execute computer readable program instructions, such as program instructions for controlling the operation and performance of one or more of the various other components of the computing device 105. In embodiments, the processor 115 interprets and executes the processes, steps, functions, and/or operations of the present disclosure as described herein, which may be operatively implemented by the computer readable program instructions. In embodiments, the processor 115 may receive input signals from one or more input devices 130 (e.g., heart monitor or other external equipment described and used herein) and/or drive output signals through one or more output devices 135. The input devices 130 may also be, for example, a keyboard or touch sensitive user interface (UI) or any of the sensors (e.g., heart monitor or other monitoring device described herein or which is incorporated by reference herein).

Still referring to FIG. 2, the storage device 120 may include removable/non-removable, volatile/non-volatile computer readable media, which is non-transitory media such as magnetic and/or optical recording media and their corresponding drives. The drives and their associated computer readable media provide for storage of computer readable program instructions, data structures, program modules and other data for operation of the computing device 105. In embodiments, the storage device 120 may store operating system 145, application programs 150, and program data 155 in accordance with aspects of the present disclosure. The storage device 120 may store the above noted calculations and other data such as, e.g., energy costs per segment, e.g., average heart rate (HR) data for an entire constant speed test run; average per segment heart rate (SHR); time (T) of an entire test run; and energy consumed, in Kilocalories (Kcals), for an entire test run. The storage device 120 may store course difficulty ratings identifying Factor/multiplier; monitored Kcals as an estimated energy used by a runner in kilocalories, for an entire run, based on age, sex, weight, fitness level and other data programmed into the heart rate monitor; and time of the entire test run in minutes and fraction of minutes, as further examples.

The system memory 125 may include one or more storage mediums, which is non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The one or more input devices 130 may include one or more mechanisms that permit an operator to input information to computing device 105, such as, but not limited to, a touch pad, dial, click wheel, scroll wheel, touch screen, one or more buttons (e.g., a keyboard), mouse, game controller, track ball, microphone, camera, proximity sensor, light detector, motion sensors, biometric sensor, or any of the sensors already described herein (e.g., as shown and described) and combinations thereof. The one or more output devices 135 may include one or more mechanisms that output information to an operator, such as, but not limited to, audio speakers, headphones, audio line-outs, visual displays, antennas, infrared ports, tactile feedback, printers, or combinations thereof.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, the computing device 105 may be connected to remote devices or systems via one or more local area networks (LAN) and/or one or more wide area networks (WAN) using the communication interface 140.

As discussed herein, the computing system 100 may be configured to provide the process, steps, methods and/or functionality as already described herein in response to the processor 115 executing program instructions contained in a computer readable medium, such as system memory 125. The program instructions may be read into system memory 125 from another computer readable medium, such as data storage device 120, or from another device via the communication interface 140 or server within or outside of a cloud environment.

In an embodiment of the invention, there is a computer program product for providing the above processes and functionality as described herein. The computer program product includes a non-transitory computer usable storage medium having program code embodied in the storage medium. The program code is readable/executable by a computing device to provide any combination of the above processes and functionality as described herein. In a further aspect of the invention, there is a computer system for providing the above processes and functionality as described herein as described with respect to FIG. 2, which can provide the functionality described herein using the computer program product.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
   obtaining performance equivalences (PEQs) of a first rated course including a track equivalent time of running on the first rated course, wherein the obtaining the PEQs comprises:
   monitoring and recording physiological data of subjects on metabolic testing equipment to compare energy costs between subjects running at controlled speeds for an exact distance on the first rated course and corresponding race distance on a track at controlled speeds; and
   determining a percentage of increased energy costs used by the subjects running on the track and the running course, which is a difficulty rating of at least the first rated course,
   setting a goal time of running a second rated course based on performance of running the first rated course which includes the track equivalent time; and
   providing pace targets for the second rated course using the track equivalent time and the goal time such that the pace targets cumulatively add up to be an overall goal time of the second rated course.

2. The method of claim 1, wherein the PEQs produce a time differential of the track equivalent time of running the first rated course and the goal time or selected performance level of the second rated course.

3. The method of claim 1, wherein the pace targets comprise split times per a selected segment of the second rated course.

4. The method of claim 3, wherein a last segment of the split times is based on heart rate and energy data collected on the second rated course, the heart rate and energy data reflect topographical and other difficulty factors specific to each segment of the second rated course.

5. The method of claim 1, wherein the goal time is a time in which the runner is capable of running on the second rated course based on the PEQs of the first rated course.

6. The method of claim 1, further comprising a time differential based on a difference between the track equivalent time and the goal time, which produces the pace targets.

7. The method of claim 1, wherein the first rated course and the second rated course are rated by comparisons of energy cost on precision measured courses.

8. The method of claim 7, wherein the comparisons of energy costs are combined with the track equivalent time and the goal time to calculate individual course segment energy costs.

9. The method of claim 8, further comprising providing an overall course performance energy matrix multiplier comprising:

$$F = K\text{cals} \div (T \times HR),$$

where F is a course difficulty identifying Factor/multiplier; Kcals is monitor estimated energy used by a runner in Kilocalories, for an entire run; T is Time of an entire test run in minutes and fraction of minutes; and HR is average Heart Rate of the entire test run.

10. The method of claim 9, wherein the course segment energy costs are calculated using: $ST \times SHR \times F = SK\text{cals}$,
   where: ST is a specific Segment Time in minutes and fractions of a minute within a test run; SHR is a specific Segment average Heart Rate; F is the course difficulty identifier Factor/multiplier; and SKcals are estimated energy costs per Segment in Kcals within the test run.

11. The method of claim 10, further comprising, for each segment, determining a % of SKcals of all segment, and multiplying the % of SKcals for all segments by the time difference between the track equivalent time from the first rated course and the goal time on the second rated course to obtain a time above an average per mile pace from the track equivalent time.

12. The method of claim 11, wherein the differential between the track equivalent time and the goal time comprises additional seconds a runner will use on a course above that on a track if he or she were to run both at a same performance level in similar conditions.

13. The method of claim 1, wherein segment pace targets which produce an overall goal time on the second rated course are calculated by dividing average heart rates produced within individual segments of the second rated course during a test run, by total heart rate average of a same test run over the entire course, and multiplying resulting percentages by average per mile additional seconds to be added each mile above an average per mile track equivalent pace, to cumulatively produce the goal time.

14. The method of claim 1, wherein the pace targets are calculated by:
   determining a percentage heart rate per complete mile and last fraction of a mile by dividing average heart rates between individual segments for each complete mile and the last fraction of mile by heart rate average for an entire test run of the second rated course;
   determining an additional amount of seconds needed to reach the goal time for the entire second rated course;
   determining per mile average number of additional seconds for the complete miles by dividing the additional number of seconds needed to obtain the goal time by miles of the second road course;
   determining per mile average number of additional seconds for the last fraction mile by dividing the per mile average number of additional seconds for the complete miles by the last fraction of mile;
   obtaining pace targets for each complete mile by multiplying the per mile average number of additional seconds for complete miles with the percentage heart rate per segment to obtain seconds above the track equivalent time and adding to the track equivalent time;
   obtaining the pace target for the last fraction mile by multiplying the per mile average number of additional seconds for complete miles with the percentage heart rate per segment to obtain seconds above the track equivalent time and adding to the track equivalent time.

15. The method of claim 1, further comprising a computer program product for providing the method of claim 1, wherein the computer program product includes a non-transitory computer usable storage medium having program code embodied in the storage medium, the program code is readable/executable by a computing device to provide the method of claim 1.

16. The method of claim 1, further comprising a computer system for providing the method of claim 1, the computer system includes a CPU, a computer readable memory and a computer readable storage medium, the computer system includes one or more program instructions, the program instructions are operable to provide the method of claim 1.

* * * * *